Oct. 30, 1962     W. J. READING     3,060,660
EGG HANDLING DEVICE

Filed Dec. 7, 1959     4 Sheets-Sheet 1

INVENTOR.
WALTER J. READING
BY
Beau, Brooks, Buckley & Beau.
ATTORNEYS

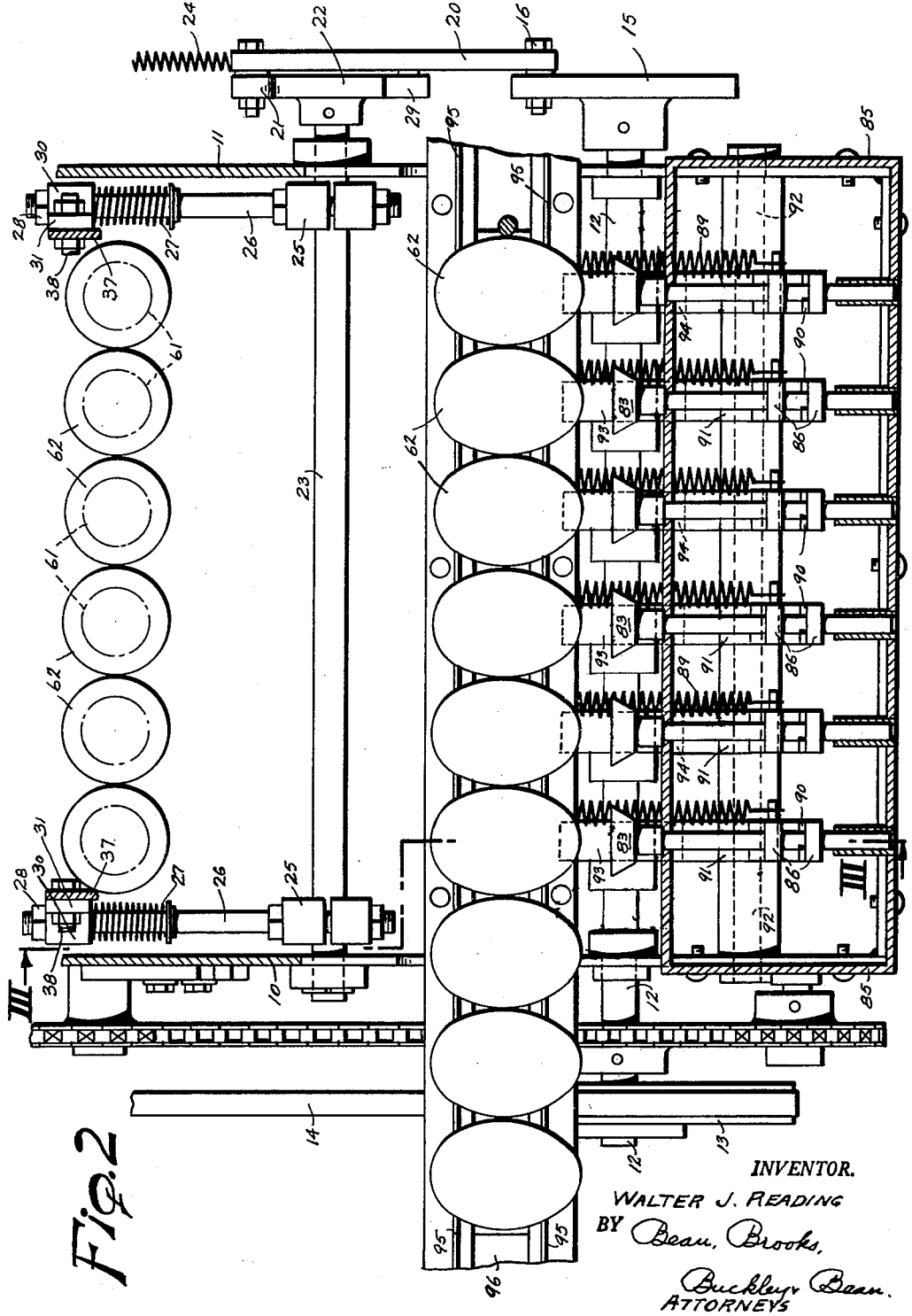

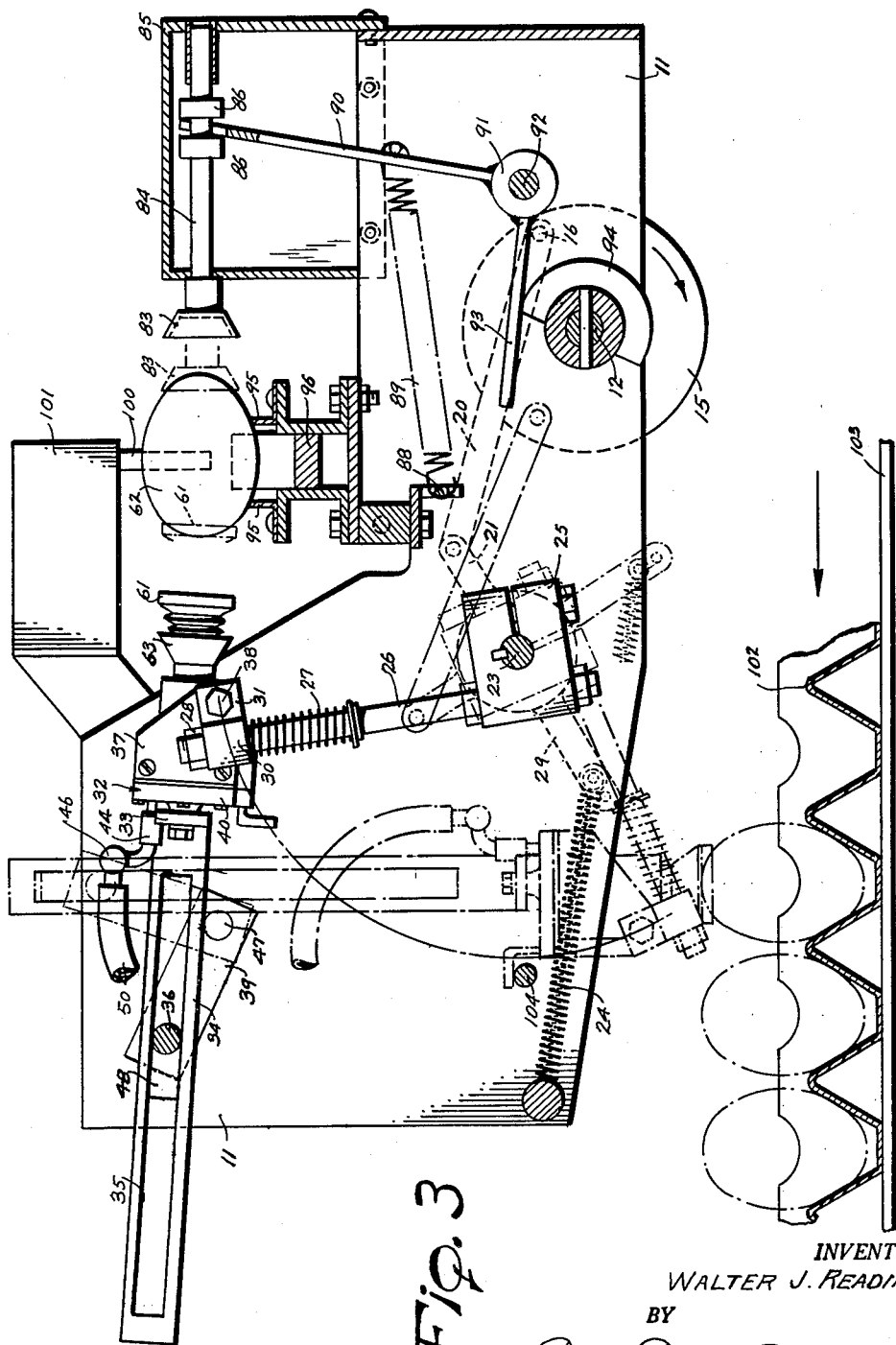

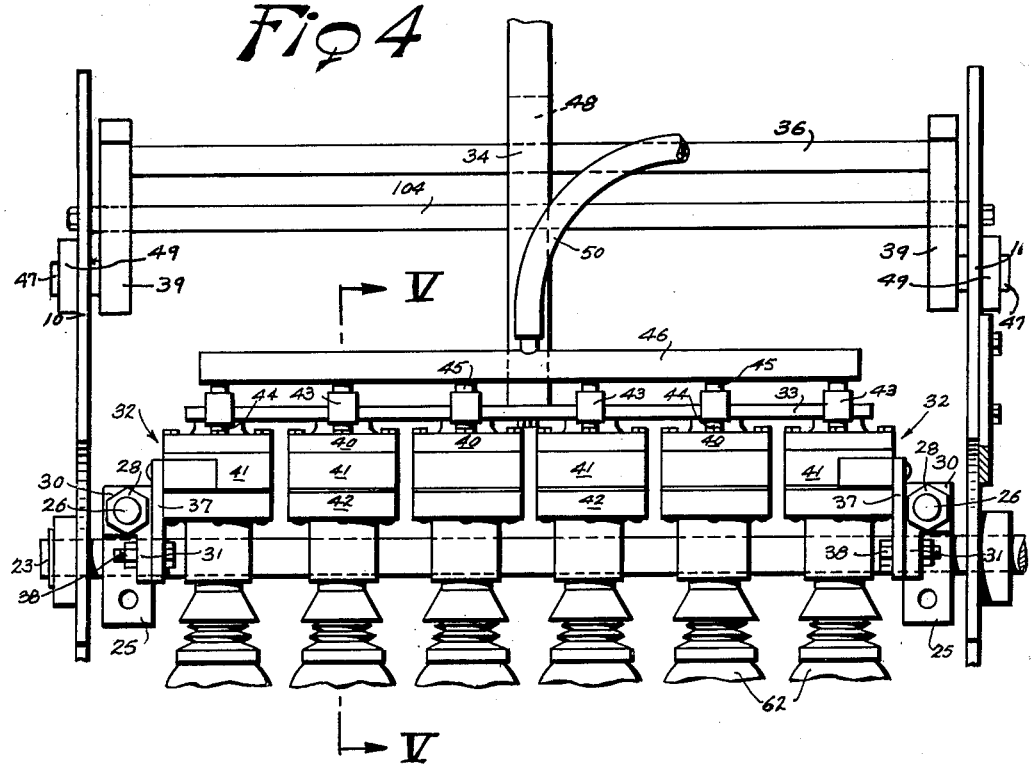
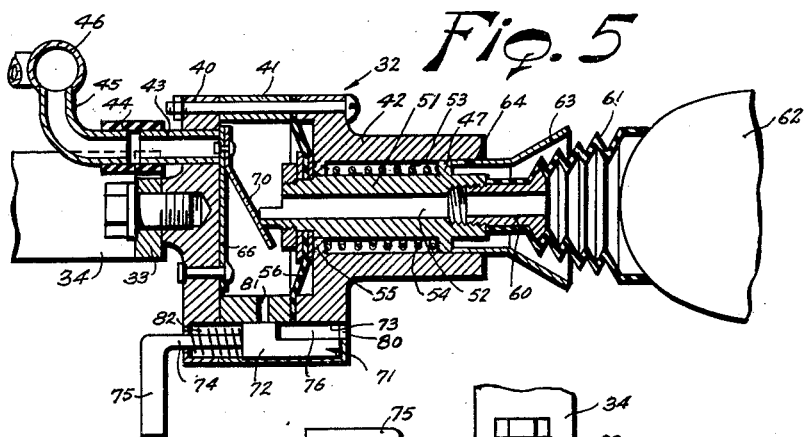
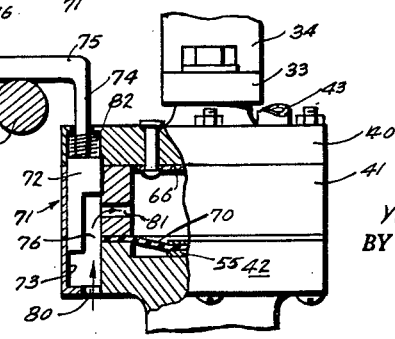

United States Patent Office 3,060,660
Patented Oct. 30, 1962

3,060,660
EGG HANDLING DEVICE
Walter J. Reading, Agency Road, R.R. 1, Ottumwa, Iowa
Filed Dec. 7, 1959, Ser. No. 857,874
17 Claims. (Cl. 53—246)

My invention relates in general to improvements in egg handling devices and in particular to vacuum-actuated means for packing eggs in cartons or flats.

The principal object of my invention is to provide a device for automatically holding a plurality of accumulated eggs by means of vacuum and then depositing them in suitable cartons.

Another object is to provide a device for supporting a plurality of eggs with their major axis in a horizontal plane.

Another object is to provide a device having a plurality of egg cups each formed with corrugated pleats for engaging one of the ends of each of the eggs while temporarily holding the opposite end thereof against horizontal movement.

Another object is to provide a device having vacuum cups formed with relatively large suction orifices to thereby minimize the possibility of clogging.

A further object is to provide a device having a reciprocating backup cup for supporting the egg as the vacuum cup is applied to the opposite end thereof.

A further object is to provide a device for engaging and holding the eggs in individual cups by means of vacuum and then for turning the eggs through an angle substantially 90° and depositing them into registering cartons by the relief of the vacuum.

Moreover, each vacuum cup has an individual vacuum connection, whereby should the suction connection to any one of the egg cups be clogged by the meat of a broken egg or by foreign matter, the suction to the other cups will not be affected.

Furthermore, my device is economical to manufacture and use, and one that may be readily cleaned.

The above objects and advantages have been accomplished by the device shown in the accompanying drawings, of which:

FIG. 2 is a fragmentary plan view, portions thereof being broken away and sectioned on line II—II of FIG. 1;

FIG. 3 is a sectional elevation of the device taken on line III—III of FIG. 2;

FIG. 4 is a fragmentary plan view of my device;

FIG. 5 is an enlarged sectional view of one of the vacuum heads of my device showing the vacuum cup thereof engaged with an egg and ready to be attached thereto by means of vacuum; and, FIG. 6 shows a fragmentary sectional view of one of the vacuum heads in position to release the vacuum and deposit the attached egg.

Figure 1:
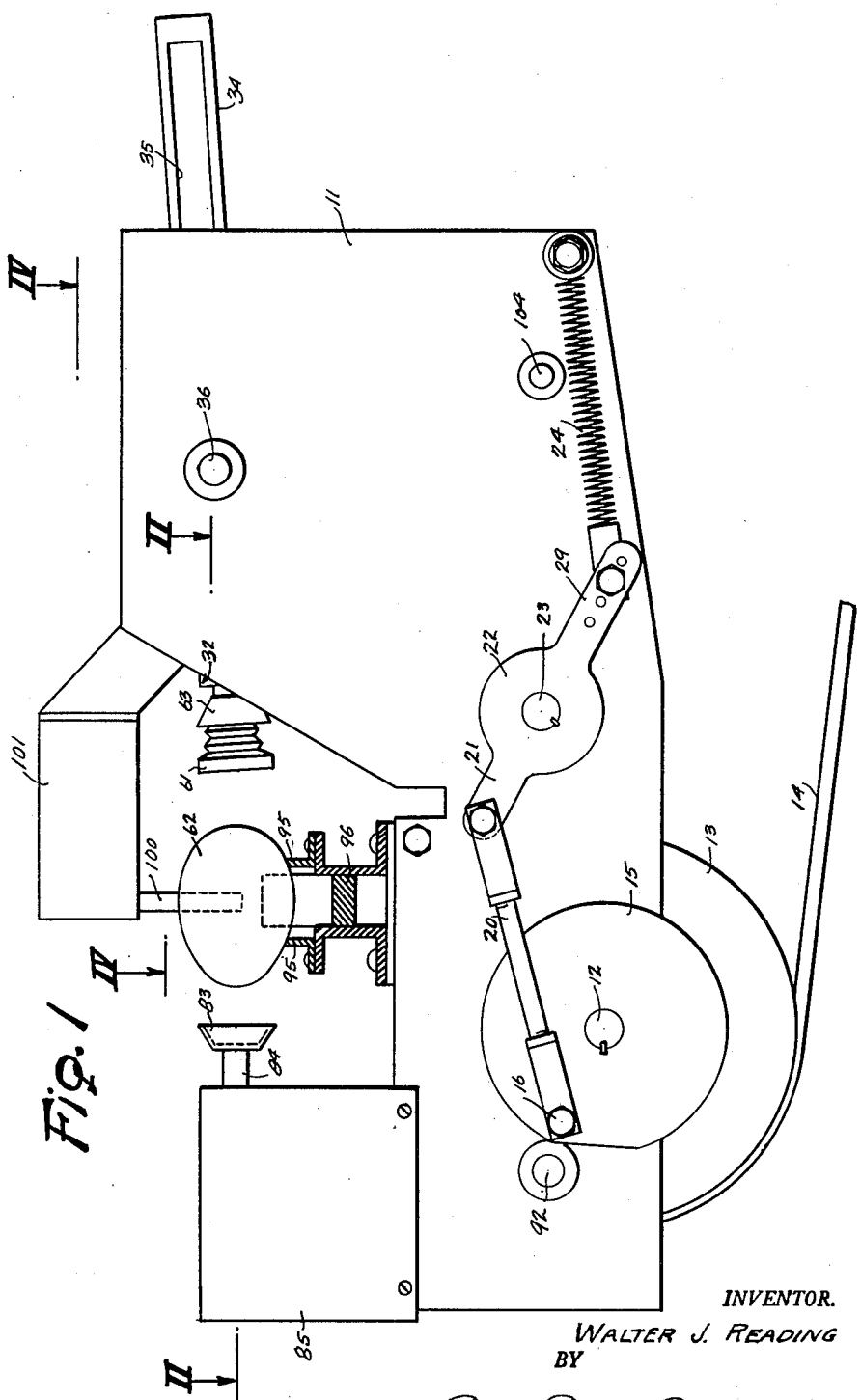
FIG. 1 is a side elevation of my device.

My device comprises two spaced body plates 10 and 11. Rotatably supported by the said plates is an actuating shaft 12 upon which is mounted a drive pulley 13 having a drive belt 14 actuated by any suitable means. The drive shaft 12 carries at its opposite end a crank disk 15 which is disposed adjacent the outside face of the body plate 11. This drive shaft and crank disk are in constant rotation during the operation of the device. The crank disk carries a crank pin 16 which is connected at one end to an actuator link 20, having its other end pivotally connected to the link lever 21 of an oscillating disk 22 whereby the disk is caused to oscillate back and forth as the crank disk 15 is rotated. The oscillating disk 22 is mounted upon the outer end of an actuating shaft 23 which is rotatably supported by the body plates 10 and 11. A spring-engaging lever 29 is formed on the disk 22 and it extends diametrically opposite the lever 21. A return spring 24 is preferably attached to one end to the lever 29, the other end of the spring being attached to the body plate 11.

Mounted upon the actuating shaft 23 and arranged near the inner face of each of the plates 10 and 11 is a vacuum head actuator 25. One actuator is provided at each end of the actuating shaft 23 and each of these actuators has an actuator rod 26 extending normally in an upward direction, the upper end of which is slidably mounted within a rod bearing 30 forming part of a vacuum head pivot lug 31. A nut 28 is carried by the upper end of each of said actuator rods for engagement with the upper surface of the rod bearing. A spring 27 is mounted upon each rod 26, whereby the vacuum head assembly will be maintained in normal position. Each of the pivot lugs is pivotally attached to the adjacent vacuum head by means of a head bracket 37 and a co-operating pivot bolt 38.

A plurality of vacuum heads 32 are carried by the plates 10 and 11 and they are arranged in a horizontal row and fastened to each other by means of a valve guide flange 33 forming part of a valve guide 34. This valve guide is preferably formed with a longitudinal slot 35 for engagement with a valve guide bar 36. Each end of the valve guide bar 36 is fixed to a guide arm 39 in non-rotatable manner, the opposite end of each of these arms being provided with a stud shaft 47 rotatably mounted in bearings 49 carried by said body plates. The valve guide bar 36 carries a slide member 48 which is welded to the bar and is slidably mounted within said slot, whereby the guide bar, the slide member and the guide arms constitute one unitary structure. Each of the vacuum heads 32 comprises a suction valve plate 40 which is attached to the valve guide flange 33, a valve chamber 41, and an intake chamber 42. A suction tube 43 is carried by the suction valve plate 40 and extends through the plate flush with the inner surface thereof. Each of these tubes 43 is connected by means of a coupling 44 and a connection 45 to a vacuum manifold 46 to which a suction conduit 50 is attached. This conduit is connected to a suitable vacuum pump (not shown) whereby the valve chamber 41 may be evacuated. The intake chamber 42 is formed with a reciprocating plunger 51 formed with a central suction orifice 52. This plunger extends through a counterbore 53 formed in the intake chamber and it is slidably supported by a bearing flange 55 extending into the counterbore. The plunger is formed with an integral collar 47 projecting into the counterbore, and a helical spring 54 is mounted in the counterbore and bears against said flange and collar, whereby the plunger is normally urged in its outward direction. A flexible diaphragm 56 is carried by the inner end of the plunger and is mounted within a suitable recess formed in the intake chamber. This diaphragm is therefore disposed between the intake chamber and the valve chamber and serves to seal the valve chamber against leakage of air. The plunger is provided at the outer end with an egg cup sleeve 60 which is screw-threaded therein and which provides a suitable support for the inner end of a flexible egg cup 61. This egg cup is in the form of a sheath of accordion form whereby when pressed against an egg 62 it will yield and will hold the egg thereagainst when placed under vacuum. So as to rigidify and reinforce the flexible egg cup 61, a reinforcing cup 63 is mounted in a counterbore 64 formed in the outer end of the intake chamber. Mounted within the valve chamber of the vacuum head is a flexible valve seat member 66 which is suitably secured at its lower end to the suction valve plate 40, having its upper end disposed opposite to and closing the inner end of the tube 43. A flat valve spring 70 is secured to the upper end of the valve seat member 66, and this spring is so formed and positioned that, when actuated by the plunger 51, it will bend the valve seat member, thereby opening the orifice of the tube 43 and exposing the egg cup to suction, thereby grasping the associated egg when pushed against it. In order to break the vacuum existing in each of the vacuum heads, I provide a relief valve 71 which comprises a piston 72 mounted within a cylindrical recess 73 formed in the head. This piston is reciprocated by means of a piston rod 74 having a relief arm 75. The plunger 72 is preferably formed in the lower portion of its side wall with a relief groove or recess 76 extending to the lower end thereof. This recess is in normal registration with an air intake orifice 80 formed in the vacuum head. A relief orifice 81 is formed through the side wall of the valve chamber 41 and it is normally sealed by the valve piston 72 when in the position shown in FIG. 5. When, however, the piston is raised to its elevated position by means to be hereinafter described, the groove 76 thereof will be moved upwardly against the tension of a spring 82 and thus serves to expose the relief orifice 81, thereby breaking the vacuum and allowing the eggs held by the cups to be released therefrom and deposited into the registering receptacles of the carton 102.

As hereinbefore pointed out, the actuating shaft is oscillated back and forth by means of the oscillating disk 22 and the actuator is thereby rocked from its full line position to its dot and dash position as shown in FIG. 3. As the parts move from one of these positions to the other, the vacuum head assembly with the attached eggs will be moved rearwardly in an arcuate path and cause the valve guide 34 to be moved rearwardly over the slide member 48. As the slide member moves in the slot and as the guide arm assembly rotates in an arcuate path around the stud shafts 47, the valve guide 36 area is moved around to the vertical positon shown by the dot and dash lines of FIG. 3, whereby the eggs will be positioned over and in substantial registration with the receptacles of the carton 102. As the vacuum head assembly is completing the downward movement the arms 75 of the relief valves will be brought into contact with the vent bar 104 and serve to open the relief valves 71 allowing atmospheric air to enter the vacuum chambers of the heads through orifices 80 and 81, thus breaking the vacuum in the cups 61 and releasing the eggs as they come to rest in registering pockets of the egg carton.

Arranged opposite each of the eggs of the accumulated group is a backup cup 83 each mounted upon a backup rod 84 slidably supported within a casing 85. Each rod is formed with two spaced collars for engagement with a backup lever 90 forming a part of the backup bell crank 91. These bell cranks are mounted upon a backup shaft 92 supported by the body plates 10 and 11. Each of the bell cranks 91 is formed with a cam lever 93 each of which engages a backup cam 94 mounted upon the drive shaft 12. A helical spring 89 is attached to each lever 90 and at its opposite end to an abutment lug 88 which serves to keep the cam levers 93 in engagement with the surfaces of the cams. As the drive shaft 12 is rotated, the cams will cause the backup bell cranks to be reciprocated; and, since the actuating shaft and the drive shaft are connected by means of the link 20, the vacuum head actuator and cams will be actuated in synchronism. The actuation of these parts is so timed that when the vacuum cup is moved forwardly to engage the selected end of an egg, the backup cup will be presented in timed relation to support the egg while it is being grasped by the egg cup. The eggs are preferably supported by egg guides 95 between which is passed a conveyor chain 96 of any suitable design.

It is important that the eggs accumulated on the egg guides 95 be oriented properly. The mechanism for accomplishing this does not form part of this invention and any suitable device may be employed, as for instance, that shown and described in my application Serial No. 800,699, filed March 30, 1959.

As shown in FIGS. 2 and 3 when a series of eggs of predetermined number have been accumulated upon the guide 95 ready to be grasped by the vacuum heads, a finger 100 carried by a limit switch 101 will be actuated to feed the carton so as to receive the next group of eggs to be lowered into and received by the carton. This mechanism is not shown or described since it does not form a part of this invention.

While the vacuum heads are shown as being individual units fastened together by means of the flange 33 of the valve guide rod, it is obvious they may be made in one continuous casing formed with separate compartments. These and other modifications may be made without departing from the spirit of my invention or the scope of the appended claims, and I do not, therefore, wish to be limited to the exact details herein shown and described.

What is claimed is:

1. An egg carton loading device, comprising track means for supporting a succession of eggs in pickup positions, vacuum cup means engageable with said eggs while being supported, a vacuum supply device, means carried by each vacuum cup means and operated in response to engagement thereof with an egg to connect said vacuum cup means to said vacuum supply device, conveyor means to deliver a succession of cartons, means for moving said cup means with the attached eggs from said pickup positions through a substantial angle into carton loading positions, and means for breaking the vacuum existing in said cup means to release the eggs and deposit them into said cartons.

2. An egg carton loading machine having inlet track means adapted to receive successions of eggs, delivery conveyor means adapted to receive a succession of cartons and to displace them consecutively relative to the discharge portion of said machine, transfer means comprising a frame device pivotally mounted upon said machine to oscillate between egg pickup and carton loading positions, said frame having a gang of vacuum pickup devices and including vacuum cups disposed to engage the ends of said eggs when in egg pickup positions, vacuum supply means connected to said vacuum pickup devices, each pickup device including a normally closed valve operable to be opened in response to engagement of the associated vacuum cup with an egg so as to cause the associated vacuum cup to be connected with said vacuum supply means only when engaged with an egg and thereby to engage and hold the egg with load-sustaining force, and vacuum release means operable upon movement of said frame into egg discharge position to break the vacuum in each vacuum device to release the eggs and deposit them into the carton.

3. An egg carton loading machine having inlet track means adapted to receive successions of eggs arranged in line with their major axes disposed substantially horizontally and transversely of the line of eggs, delivery conveyor means adapted to receive a succession of cartons and to displace them consecutively relative to the discharge portion of said machine, transfer means comprising a frame device pivotally mounted upon said machine, oscillator means for actuating said transfer means between egg pickup and carton loading positions, said frame having a gang of vacuum pickup devices and including vacuum cups disposed to engage the ends of said eggs when in egg pickup positions, vacuum supply means connected to said vacuum pickup devices, each pickup device including a normally closed valve operable to be opened in response to engagement of the associated vacuum cup with an egg so as to cause the associated vacuum cup to be connected with said vacuum supply means only when engaged with an egg and thereby to engage and hold the egg with load-sustaining force, and vacuum release means operable upon swinging of said frame into egg discharge position to break the vacuum in each vacuum device to release the eggs and deposit them into the carton.

4. An egg carton loading machine having inlet track means adapted to receive successions of eggs arranged in line with their major axes disposed substantially horizontally and transversely of the line of eggs, delivery conveyor means adapted to receive a succession of cartons and to displace them consecutively relative to the discharge portion of said machine, transfer means comprising a frame device pivotally mounted upon said machine, oscillator means for actuating said transfer device between egg pickup and carton loading positions, said frame having a gang of vacuum pickup devices and including vacuum cups disposed to engage one of the ends of said eggs when in egg pickup positions, means for temporarily engaging the eggs at their opposite ends to hold them against axial movement when being engaged by the vacuum pickup devices, vacuum supply means connected to said vacuum device for causing the vacuum cups to grip the eggs, and vacuum release means operable upon swinging of said frame into egg discharge position to break the vacuum in each vacuum device to release the eggs and deposit them into the carton.

5. An egg carton loading machine having inlet track means adapted to receive successions of eggs arranged in line with their major axes disposed substantially horizontally and transversely of the line of eggs, delivery conveyor means adapted to receive a succession of cartons and to displace them consecutively relative to the discharge portion of said machine, transfer means comprising a frame device pivotally mounted upon said machine, oscillator means for actuating said transfer device between egg pickup and carton loading positions, said frame having a gang of vacuum pickup devices and including vacuum cups disposed to engage one of the ends of said eggs when in egg pickup positions, a slidably mounted backup cup substantially coaxial with each of said vacuum cups, means actuated by the backup cups in synchronism with the actuation of said vacuum cups for temporarily engaging the opposite ends of the eggs for holding said eggs against axial movement when the vacuum cups are engaged, vacuum supply means connected to said vacuum device for causing the vacuum cups to grip the eggs, and vacuum release means operable upon swinging of said frame into egg discharge position to break the vacuum in each vacuum device to release the eggs and deposit them into the carton.

6. An egg carton loading machine having inlet track means adapted to receive successions of eggs arranged in line with their major axes disposed substantially horizontally and transversely of the line of eggs, delivery conveyor means adapted to receive a succession of cartons and to displace them consecutively relative to the discharge portion of said machine, transfer means comprising a frame having a gang of vacuum pickup devices and including vacuum cups disposed to engage one of the ends of said eggs when in egg pickup positions, means for pivotally mounting said frame, an oscillating actuator, means for connecting said actuator to said frame for moving the latter from the horizontal position to a substantially vertical discharge position, vacuum supply means connected to said vacuum devices for causing the vacuum cups to grip the eggs, and vacuum release means operable upon swinging of said frame into egg discharge position to break the vacuum in each vacuum device to release the eggs and deposit them into the carton.

7. An egg handling device, comprising track means for supporting a succession of eggs in pickup positions with their major axes lying substantially horizontally, a vacuum head assembly having a gang of pickup devices and including vacuum cups disposed to engage the ends of said eggs in pickup positions, a stationary guide bar engageable with said assembly for pivotally and slidably mounting the latter, an actuator for said head assembly, means for oscillating said actuator, said actuator having an actuator rod, bearing means slidably mounted upon said rod and pivotally connected to said assembly, whereby said assembly may be oscillated from the horizontal position to a substantially vertical position, means for evacuating said cup means to grip the eggs, conveyor means to deliver a succession of cartons, means for moving said vacuum cups with the attached eggs into substantially vertical carton loading positions, and means for breaking the vacuum existing in said vacuum cups to release the eggs and deposit them into said carton.

8. An egg handling device, comprising track means for supporting a succession of eggs in pickup positions with their major axes lying substantially horizontally, a vacuum head assembly having a gang of pickup devices and including vacuum cups disposed to engage the ends of said eggs in pickup positions, a stationary guide bar engageable with said assembly for pivotally and slidably mounting the latter, an actuator for said head assembly, means for oscillating said actuator, said actuator having an actuator rod, a pivot lug rotatably secured to said assembly and formed with a bearing slidably secured upon said actuator rod, a helical spring mounted upon said rod and biased against said bearing, whereby said assembly may be oscillated from the horizontal position to a substantially vertical position, means for evacuating said cup means to grip the eggs, conveyor means to deliver a succession of cartons, means for moving said vacuum cups with the attached eggs into substantially vertical carton loading positions, and means for breaking the vacuum existing in said vacuum cups to release the eggs and deposit them into said cartons.

9. An egg handling device, comprising spaced body plates, means carried by said plates for supporting a succession of eggs with their major axes lying substantially horizontally, a vacuum head assembly having a gang of pickup vacuum cups disposed to engage the ends of said eggs, a stationary guide bar carried by said plates and engageable with said assembly for pivotally and slidably mounting the latter, an actuator shaft carried by said plates, an actuator mounted upon said actuator shaft, an actuator rod carried by said actuator, bearing means slidably mounted upon said rod and pivotally connected to said assembly, whereby said assembly may be oscillated from said horizontal position to a substantially vertical position, a drive shaft carried by said plates, a backup cam carried by said drive shaft, crank means carried by said drive shaft and connected to said actuator shaft for oscillating said actuator, means for evacuating said cups to attach the registering eggs thereto, a slidably mounted backup cup disposed opposite each vacuum cup, means actuated by said backup cam for moving said backup cups in synchronism with the actuation of said vacuum cups for temporarily engaging said eggs for holding them against horizontal movement when said vacuum cups are applied, and means for breaking the vacuum existing in said vacuum cups to release the eggs and deposit them into said carton.

10. An egg carton loading machine having inlet track means adapted to receive successions of eggs arranged in line with their major axes disposed substantially horizontally and transversely of the line of eggs, delivery conveyor means adapted to receive a succession of cartons and to displace them consecutively relative to the discharge portion of said machine, transfer means comprising a frame device pivotally mounted upon said machine to oscillate between egg pickup and carton loading positions, said frame having a gang of vacuum pickup devices and including vacuum cups disposed to engage the ends of said eggs when in egg pickup positions, vacuum supply means connected to said vacuum device for causing the vacuum cups to grip the eggs, valve means carried by each of said pickup devices for evacuating said vacuum cups, a plunger carried by each of said pickup devices and engageable with said valve means to connect said source of vacuum to said pickup devices, and means for breaking the vacuum existing in said pickup devices and to release the eggs and deposit them into said cartons.

11. An egg loading machine, comprising means for supporting an egg in pickup position, a transfer device having a flexible vacuum cup, vacuum supply means connected to said transfer device for causing the vacuum cup to grip the egg, a backup cup disposed opposite said vacuum cup, cam means for actuating said backup cup in synchronism with the actuation of said transfer device for temporarily holding said egg against horizontal movement when the vacuum cup is engaged with said egg, means for oscillating said transfer device from a horizontal position to a vertical position, and vacuum release means operable upon movement of said transfer device to vertical egg discharge position to break the vacuum for releasing the egg.

12. An egg handling device, comprising spaced body plates, means carried by said plates for supporting a succession of eggs with their major axes lying substantially horizontally, a vacuum head assembly having a gang of pickup vacuum cups disposed to engage the ends of said eggs, transfer means comprising a frame device pivotally mounted upon said machine to oscillate between egg pickup and carton loading positions, said frame having a gang of vacuum pickup devices and including vacuum cups disposed to engage the ends of said eggs when in egg pickup positions, vacuum supply means connected to said vacuum device for causing the vacuum cups to grip the eggs, valve means carried by each of said pickup devices for evacuating said vacuum cups, a plunger carried by each of said pickup devices and engageable with said valve means to connect said source of vacuum to said pickup devices, a vent rod carried by said plates and engageable with the vent valves when said transfer device is moved from horizontal to vertical position to release the vacuum existing in said cups to deposit said eggs in said cartons.

13. In an egg pickup device, a hollow body presenting a vacuum chamber, means for connecting said chamber to a vacuum supply device and including a normally closed valve whereby said chamber is normally disconnected from the vacuum supply, a flexible diaphragm in said body separating its interior into said vacuum chamber on one side and an atmospheric chamber on the other side, said body having a bore leading into its interior, a plunger reciprocably received in said bore and connected, at its inner end, to said diaphragm, a vacuum cup mounted on the outer end of said plunger, and there being a bore through said plunger communicating the interior of said vacuum cup with said vacuum chamber, spring means acting on said plunger urging the same in an outward direction relative to said body, said valve being initially opened by said plunger in response to movement of the plunger inwardly of the body, whereby the pickup device is operable only when the vacuum cup is engaged against the object to be picked up with sufficient force to overcome said spring means.

14. In an egg pickup device, a body and means for moving the body into pickup position, a plunger reciprocably carried by said body for movement between relatively projected and relatively retracted positions, resilient means normally urging said plunger to its relatively projected position, vacuum cup means carried by said plunger, and means including a valve within said body responsive to movement of said plunger from its relatively projected position, as when the vacuum cup means is engaged against an egg, to communicate said vacuum cup means with a source of vacuum supply.

15. The device according to claim 14 wherein said valve is in the form of a deformable reed engageable by said plunger.

16. The device according to claim 14 including a flexible diaphragm carried by said body and connected to said plunger, said diaphragm being constantly subjected to atmospheric pressure on one side thereof and being subjected to negative pressure on its opposite side when the last means is actuated, whereby to oppose said resilient means.

17. The device according to claim 14 and means for holding the plunger from its relatively projected position in response to opening of said valve.

References Cited in the file of this patent

UNITED STATES PATENTS

| 1,987,336 | Powell | Jan. 8, 1935 |
| 2,247,787 | Schmidt | July 1, 1941 |
| 2,359,432 | McNamara | Oct. 3, 1944 |
| 2,903,290 | Morris et al. | Sept. 8, 1959 |

FOREIGN PATENTS

| 58,620 | Denmark | Apr. 21, 1941 |